United States Patent [19]
Voorman

[11] 3,849,609
[45] Nov. 19, 1974

[54] HYBRID CIRCUIT

[75] Inventor: Johannes Otto Voorman, Emmasingel, Eindhoven, Netherlands

[73] Assignee: U.S. Philips Corporation, New York, N.Y.

[22] Filed: May 7, 1973

[21] Appl. No.: 357,801

[30] Foreign Application Priority Data

June 15, 1972 Netherlands ...................... 7208148

[52] U.S. Cl. ........................ 179/170 NC, 179/170 T
[51] Int. Cl. ............................................ H04b 1/58
[58] Field of Search ....... 179/170 NC, 170 T, 81 A, 179/170 R; 178/66 R, 68, 70 R, 70 TS

[56] References Cited

UNITED STATES PATENTS

| | | | |
|---|---|---|---|
| 2,511,948 | 6/1950 | Wang | 179/170 NC |
| 3,530,260 | 9/1970 | Gaunt, Jr. | 179/170 NC |
| 3,689,710 | 9/1972 | Colardelle et al. | 179/170 T |
| 3,700,831 | 10/1972 | Aagaard et al. | 179/170 NC |

*Primary Examiner*—Thomas A. Robinson
*Attorney, Agent, or Firm*—Frank R. Trifari; Simon L. Cohen

[57] ABSTRACT

A hybrid circuit for coupling a two-way transmission path to a one-way transmission path and a one-way receiving path, comprising a first amplifier whose input is connected to the receiving path and whose output is connected to the two-way transmission path, a second amplifier whose input is connected to the two-way transmission path and whose output is connected to the transmission path and a third amplifier whose input is connected to the receiving path and whose output is connected to the transmission path, characterized in that the first, second and third amplifiers are current-controlled current amplifiers.

4 Claims, 4 Drawing Figures

HYBRID CIRCUIT

The invention relates to a hybrid circuit for coupling a two-way transmission path to a one-way transmission path and a one-way receiving path, comprising a first amplifier whose input is connected to the receiving path and whose output is connected to the two-way transmission path, a second amplifier whose input is connected to the two-way transmission path and whose output is connected to the one-way transmission path and a third amplifier whose input is connected to the receiving path and whose output is connected to the one-way transmission path.

Such a hybrid circuit is known from U.S. Pat. No. 2,511,948. In this known hybrid circuit each of the three amplifiers is a voltage-controlled current amplifier. The voltage controlled current amplifiers are constituted by triodes, the grid of each of the triodes forming the input of the respective amplifier and the anode of each of the triodes forming the output of the respective amplifier. The input of the first amplifier is connected to the receiving path through a variable resistor. This variable resistor serves for balancing the hybrid circuit.

A simple calculation reveals that the balancing of this known hybrid circuit is dependent on the mutual conductance of the valves used. This mutual conductance, and thus the hybrid balance, is highly temperature and current dependent. This means that the hybrid balance will have to be readjusted continually.

It is an object of the invention to provide a hybrid circuit of the type mentioned hereinbefore, which does not have this drawback and which is, moreover, extremely suitable to be manufactured in integrated circuit form and is characterized in that the first, second and third amplifiers are current-controlled current amplifiers.

The invention will be described with reference to the drawing.

Figure 1:
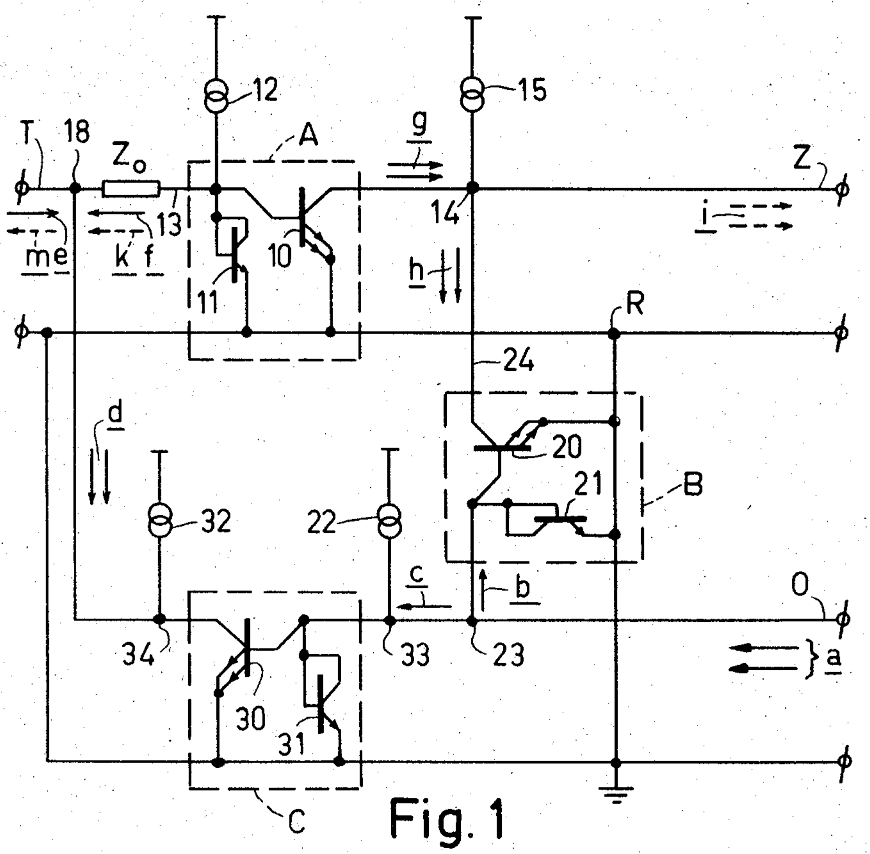
FIG. 1 shows a hybrid circuit according to the invention.

In the embodiment according to FIG. 1, T is a two-way transmission line in which signals are transmitted in both directions. The transmission line T is, for example, a subscriber's line of a telephone subscriber. A line O is the one-way transmission line, via which signals are applied to the hybrid circuit, and Z is a one-way transmission line via which signals from the hybrid circuit are transmitted. These lines constitute the receiving path and the transmission path respectively of a so-called 4-wire circuit.

The receiving path O is connected to the input 33 of a current amplifier C and to the input 23 of a current amplifier B. Said inputs 23 and 33 are also connected to a direct-current source 22. The transmission path Z is connected to an output 14 of the current amplifier A and to an output 24 of the current amplifier B. Said outputs 14 and 24 are also connected to a direct current source 15. The two-way transmission path T is connected in an input 13 of the current amplifier A via the impedance $Z_0$ and also to an output 34 of the current amplifier C. The input 13 of the current amplifier A is connected to a direct-current source 12 and the output 34 of the current amplifier C is connected to a direct-current source 32. Each of the three current-controlled current amplifiers has two parallel branches, one branch comprising a first transistor (11, 21 and 31 respectively) connected as a diode and the other branch comprising a second transistor 10, 20 and 30 respectively. The base-emitter paths of said first and second transistors are connected in parallel. The bases of the first transistors also form the inputs of the respective amplifiers and the collectors of the second transistors constitute the outputs of the respective current amplifiers. The current gain of the three current amplifiers A, B and C is adjusted to 2, which can be achieved by making the quotient of the emitter areas of the second transistor and the first transistor equal to 2, as is described, for example, in I.E.E.E.-International Solid State Circuits Conference of February 1961 on pages 16 and 17. The operation of the hybrid circuit according to FIG. 1 is as follows:

It is ssumed that a current of 2E amperes flows in the receiving path O, which is symbolically represented by the pair of arrows *a* in FIG. 1. This current will be equally distributed between the transistors 21 and 31, which are connected as diodes, if the emitter areas of the two transistors are equal. The current through the two diodes 21 and 31 will equal E amperes. As the current gain of the two current amplifiers B and C equals 2, a current of 2E amperes will flow to the respective outputs 24 and 34, which is symbolically represented by the arrow pairs *d* and *h* in FIG. 1. $Z_0$ is the termination impedance of the two-way transmission line T. If this termination impedance equals the cable impedance of the transmission line, two equal currents will flow towards point 18, which is indicated by means of the arrows *e* and *f*. The current indicated by the arrow *f* will flow through the diode 11. As the current gain of the output amplifier A equals 2, a current of 2E amperes will flow through the transistors 10 to the output 14 of the current amplifier A, see arrow pair *g*. This current has the same value as the current represented by *h*, but is in phase opposition to the latter. This means that no current will flow to the transmission path Z due to the current which flows in the receiving path and is indicated by the arrow pair *a*. It is assumed that a transmission current of E amperes flows in the two-way transmission line T, which is indicated by the dotted arrow *m* in FIG. 1. This current will flow through the diode 11 and the impedance $Z_0$ only, because the *ac* impedance between the collector and emitter of the transistor 30 is many times greater than the impedance constituted by the diode 11 and the impedance $Z_0$. As the current gain of the current amplifier A is 2, a current of 2E amperes will flow through the transistor 10 to the output of the current amplifier A. This current will flow to the transmission path $Z_0$ which is indicated by the arrow pair *i* in FIG. 1. There will be no transmission current in the transistor 20, because the *a.c* impedance between the collector and the emitter of this transistor is many times greater than the impedance of the tramsmission path Z.

As explained hereinbefore, there will be on current to the transmission path Z due to the current in the receiving path and this is achieved with the aid of the impedance $Z_0$. This means that the impedance $Z_0$ is used both for hybrid balancing and for cable matching. Consequently, no separate balance control is required. Moreover, the hybrid circuit according to FIG. 1 is extremely suitable for fabrication in integrated circuit form owing to the absence of resistors and capacitors. The current sources 12, 15, 22 and 32 provide the d.c. setting of the current amplifiers A, B and C. If the direct current to the current source 12, for example, equals I amperes and the current gain factors of the current amplifiers A, B and C equal 2, the currents through the current sources 15, 22 and 32 will equal 4I, 2I, and 2I amperes respectively.

In the embodiment of FIG. 1 the current gain of each of the three current amplifiers is 2. However, the current gain may also have a different value. A simple calculation reveals that for a correct balancing of the hybrid circuit care should be taken only that the product of the current gain factors of the first and second current amplifiers equals 2x the current gain factor of the third current amplifier. This means, therefore that the quotient of the emitter areas of the second and first transistors of the first amplifier times the quotient of the emitter areas of the second and first transistors of the second amplifier approximately equals twice the quotient of the emitter areas of the second and first transistors of the third amplifier.

From the above it is apparent that the current gain of the amplifier is defined by the quotients of the emitter areas of the transistors used, i.e. by the geometry. These quotients are current and temperature independent, so that the hybrid balance of the hybrid circuit according to the invention is also current and temperature independent.

Figure 2:
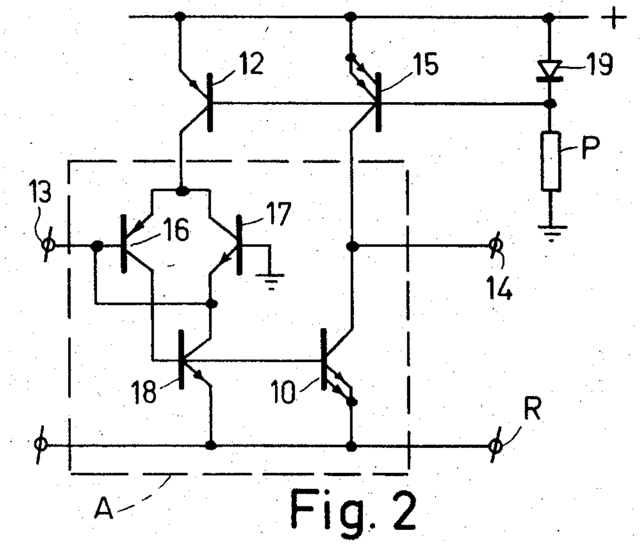
FIG. 2 shows a different type of current amplifier which may be used.

It will be obvious that it is also possible to employ current amplifiers other than those shown in FIG. 1. For example, it is also possible to use a current amplifier of the type as shown in FIG. 2. The first branch of this current amplifier also includes a third and a fourth transistor, the collector-base path of the third transistor 16 being connected in parallel opposition with the collector-base path of the first transistor 18. The collector-emitter path of the fourth transistor 17 is connected parallel to the emitter-base path of the third transistor 16. The base of the third transistor 16 is connected to the input 13 of the current amplifier A and the base of the transistor 17 is connected to a point of constant potential. The emitter of the transistor 16 is connected via the collector-emitter path of the transistor 12 to a point of constant potential. The collector of the transistor 10 is connected via the collector-emitter path of the transistor 15 to a point of constant potential. The diode 19 is connected parallel to the emitter-base paths of the transistors 12 and 15. The bases of the transistors 12 and 15 are also connected via a common resistor P to a point of constant potential. The resistor P serves for adjusting the direct current through the transistors 12 and 15. The transistors 12, 16, 17 and 18 together form a device equivalent to a transistor, as described in the prior Netherlands Pat. application 7,102,199. The base of the transistor 16 is the emitter of the equivalent transistor, the base of the transistor 17 is also the base of the equivalent transistor and the emitter of the transistor 18 forms the collector of said equivalent transistor. The voltage between the collector and the base of the equivalent transistor is constant so that the equivalent transistor is connected as a diode. Instead of the transistors 10, 12 and 15 it is also possible to use equivalent transistors as described in said prior Application. The current amplifiers may also be of a differential design.

Figure 3:
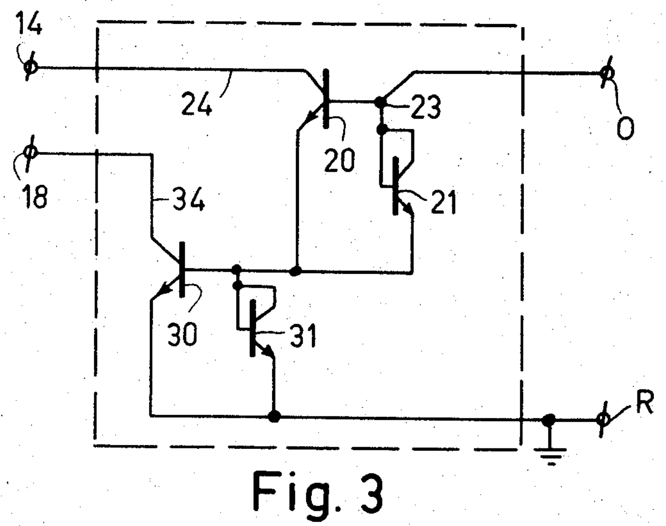
FIG. 3 shows a combination of the first and the second amplifier.
Figure 4:
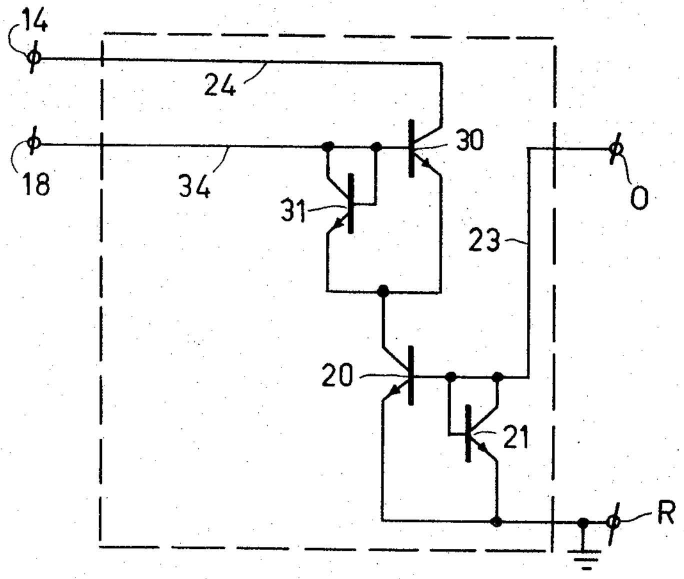
FIG. 4 shows a different combination of the first and the second amplifier.

The amplifiers B and C may be simply combined to form one amplifier having two outputs, such as shown for example in FIGS. 3 and 4. In FIG. 3 the amplifier C is formed by the transistors 20, 21, 30 and 31, its input 23 being connected to the receiving path O and its output 34 to the two-way transmission path T (18). The amplifier B is constituted by the transistors 20 and 21, its input being connected to the receiving path O and its output 24 to the transmission path Z (14). When the ratio of the emitter areas of the transistors 30 and 31 equals $S_1$ and the ratio of the emitter areas of the transistors 10 and 11 (see FIG. 1) equals $S_2$ and the ratio of emitter areas of the transistors 20 and 21 equals $S_3$. The following relation should be satisfied for a correct hybrid balance:

$$\tfrac{1}{2} \cdot S_1 \cdot S_2(S_3 + 1) = S_3 \qquad (1)$$

In this equation $S_1 \cdot (S_3 + 1)$ is the current gain factor of the first amplifier C, $S_3$ the current gain factor of the third amplifier B and $S_2$ the current gain factor of the second amplifier A.

FIG. 4 shows an alternative combination of the amplifiers B and C. In this Figure the first amplifier C is consitituted by the transistors 20, 21 and 31, its input 23 being connected to the receiving path O and its output 34 to the two-way transmission path T (18). The third amplifier B is formed by the transistors 20, 21 and 30, its input 23 being connected to the receiving path O and its output 24 to the transmission path Z (14). When the ratio of the emitter areas of the transistors 30 and 31 equals $S_3$ and the ratio of the emitter areas of the transistors 10 and 11 (see FIG. 1) equals $S_2$, the following relation should be satisfied for a correct hybrid balance.

$$2S_3 = S_2 \qquad (2)$$

The ratio of the emitter areas of the transistors 20 and 21 may be selected at will.

What is claimed is:

1. A hybrid circuit for coupling a two-way transmission path to a one-way transmission path and a one-way receiving path, of the type wherein a first amplifier has an input connected to the receiving path and an output connected to the two-way transmission path, a second amplifier has an input connected to the two-way transmission path and an output connected to the transmission path, and a third amplifier has an input connected to the receiving path and an output connected to the transmission path, the improvement wherein the first, second and third amplifiers are current-controlled current amplifiers, wherein a constant current source is connected to an input of at least one of the amplifiers, and wherein a constant current source is connected to at least one output of the amplifiers.

2. A hybrid circuit as claimed in claim 1, characterized in that the product of the current gain factors of the first and the second amplifier equals twice the current gain factor of the third amplifier.

3. A hybrid circuit as claimed in claim 1, characterized in that each of the current amplifiers has two parallel branches, of which one branch comprises a first transistor and the other branch comprises a second transistor, the base-emitter paths of the two transistors being connected in parallel, and the quotient of the emitter areas of the second and the first transistor of the first amplifier times the quotient of the emitter areas of the second and the first transistor of the second amplifier being substantially equal to twice the quotient of the emitter areas of the second and the first transistor of the third amplifier.

4. A hybrid circuit as claimed in claim 2, characterized in that the first branch also comprises a third and fourth transistor, the collector-base path of the third transistor being connected in anti-parallel with the collector-base path of the first transistor. the collector-emitter path of the fourth transistor being connected parallel to the emitter-base path of the third transistor, and the base of the third transistor constituting the input of the relevant current amplifier.

* * * * *

PO-1050
(5/69)

UNITED STATES PATENT OFFICE
CERTIFICATE OF CORRECTION

Patent No. 3,849,609 Dated November 19, 1974

Inventor(s) JOHANNES OTTO VOORMAN

It is certified that error appears in the above-identified patent and that said Letters Patent are hereby corrected as shown below:

IN THE SPECIFICATION

Col. 2, line 20, "The operation" should start a new paragraph, line 22, "ssumed" should be --assumed--;

line 61, "trams-" should be --trans- --;

Signed and sealed this 18th day of February 1975.

(SEAL)
Attest:

RUTH C. MASON
Attesting Officer

C. MARSHALL DANN
Commissioner of Patents
and Trademarks